Oct. 20, 1964 A. K. BEY 3,153,737

BIPOLAR ELECTRIC MOTOR

Filed Aug. 29, 1962 2 Sheets-Sheet 1

Inventor
Ahmet K. Bey
By Norman Gerlach
Atty.

Oct. 20, 1964 A. K. BEY 3,153,737

BIPOLAR ELECTRIC MOTOR

Filed Aug. 29, 1962 2 Sheets-Sheet 2

Inventor
Ahmet K. Bey
By Norman Gerlach
Atty.

3,153,737
BIPOLAR ELECTRIC MOTOR
Ahmet K. Bey, 1923 W. 19th St., Chicago 8, Ill.
Filed Aug. 29, 1962, Ser. No. 220,223
9 Claims. (Cl. 310—154)

The present invention relates generally to an electric motor and has particular reference to a novel bipolar motor including an asssembly of parts, a novel mechanical disposition of the parts, and a novel mechanical cooperation between the parts whereby extreme economy of manufacture and a material reduction in size, particularly in the transverse dimensions of the motor, is attained.

There are upon the market at the present time a large number of extremely inexpensive small bipolar direct current electric motors. These motors are battery-powered and usually are operated by way of electric current which is supplied by one, two, and sometimes four, ordinary flashlight batteries. They find their use principally for operating toys and miniature portable machines. Generally speaking, a motor of the type under consideration invariably employs a stationary field structure in the form of permanent magnets, a rotary armature with a number of coils, a two-segment commutator, and brushes. The simplicity of such a motor and the relatively few number of parts which cooperate to make up the over-all assembly make it possible to sell this motor on a wholesale basis for a few cents. It is to this particular type of electric motor that the present invention pertains.

As heretofore pointed out, economy of manufacture and reduction in size are the two principal features of the present invention. Insofar as economy is concerned, this is attained by effecting a very substantial reduction in the number of parts which cooperate to make up the motor of the present invention and also by positioning these parts within the motor assembly in a novel manner so that there is inherent mutual support between the parties. Insofar as a reduction in size is concerned, this reduction is concerned principally with a reduction in the over-all diameter of the generally cylindrical motor assembly and is effected by positioning the field structure so that it lies almost entirely within the extended cylindrical confines of the rotatable armature instead of within the axial confines of the armature as is the current practice in connection with a bipolar motor of the type under consideration.

Heretofore, in the construction of a portable battery-powered bipolar electric motor, it has been the practice, in order that the armature coils shall rotate within a magnetic field, to establish this field by positioning two separate permanent magnets on opposite sides of the armature in diametrical opposition to each other, the two magnets presenting pole faces of opposite polarity radially inwardly toward the armature. The magnetic lines of force extend directly across the gaps between the two pole faces and the armature coils rotate within the field which is thus established. The minimum transverse dimension of such a motor construction is necessarily the sum of the over-all diameter of the armature and the radial extent of the two permanent magnets. In the interest of compactness, the use of permanent magnets, which are of the barium ferrite type, are commonly referred to as ceramic magnets and possess an extremely short magnetic length, have enabled the transverse width of a battery-powered bipolar motor to be made reasonably small. Another type of bipolar motor, instead of utilizing single solid permanent magnets on opposite sides of the armature, employs multiple permanent magnets at the desired regions, such magnets consisting of barium ferrite chips and being propertly oriented so as collectively to present a common large pole face on each side of the armature. Despite this, and due to the fact that some sort of supporting structure or matrix is required to hold these magnetized chips in place, the accomplished size reduction leaves much to be desired. Additionally, the cost of separate magnets and the difficulty encountered in installing them increases the over-all cost of the motor.

The present invention is designed to overcome the above-noted size and cost limitations that are attendant upon the construction of present-day small battery-powered bipolar electric motor, and toward this end, the invention contemplates the provision of a bipolar motor wherein the use of peripheral magnets is completely eliminated, the magnets being completely removed from their peripheral disposition and, in addition, being consolidated into the form of a single ceramic magnet which is placed in axial alignment with the armature and has its peripheral effect preserved by the use of thin sheet metal pole pieces which are of opposite polarity and establish a magnetic path for the flux and the necessary flux gap within which the armature may rotate when electrically energized. By such an arrangement, the over-all transverse dimension or diameter of the motor as a whole need be no greater than the sum of the diameter of the armature and the thickness of the sheet metal of the pole pieces, to which is added, of course, the small clearance gaps which are required for rotation of the armature between the two sheet metal pole pieces. Also by such an arrangement, not only is the loss in field strength that is occasioned by a remote disposition of the magnet pole faces from their usual peripheral disposition compensated for but also increased field strength is attained since a greater quantity of the barium ferrite material may be employed in the construction of the field-producing structure.

In addition to size reduction resulting from an axial rather than a peripheral disposition of the field structure, and economy resulting from the use of a single permanent magnet in place of multiple magnets, certain mechanical advantages accrue from the novel arrangement of parts. Because the single permanent magnet possesses appreciable mass, not only is magnetic strength for field-producing purposes available but also the magnet, being axially disposed with relation to the armature, may be employed as a pilot bearing for the adjacent end of the armature shaft, thus completely eliminating the need for a separate journal bearing at this end of the armature shaft. A small socket which is drilled, molded or otherwise found in the inner end of the single magnet serves rotatably to pilot and support the adjacent end of the armature shaft without any other armature mounting at such end of the shaft. Still further, according to the invention, the single field-producing permanent magnet is disposed rearwardly of, and in axial alignment with, the armature and the aforementioned pole pieces which encompass the armature are cemented directly to the magnet so that the magnet and pole piece constitute a rigid cup-shaped structure within which the armature rotates. The forward or front ends of the pole pieces serve to support a unitary cylindrical hub-like brush holder which encompasses the two-segment commutator of the motor and also serves as a bearing support for the point end of the armature shaft. The brush holder is provided with radial brush guideways for reception therein of the usual brushes and compression springs, and interlocking parts on the holder and pole pieces prevent endwise shifting of the parts so that a final cementing of the pole pieces in position on the permanent magnet establishes a complete and permanent motor assembly, it being contemplated that the motor not be dismantled for repair or for any other reason once it has been assembled.

A motor which is constructed according to the principles of the present invention constitutes a complete package-type unit which may be assembled bodily in a toy or other article with which it is to be associated for powerproducing purposes without danger of dislodgment of the magnets, as is often the case in connection with present-day motors for the same purpose. Additionally, such a motor may be manufactured with wide dimension tolerances since armature, magnet and brush alignment and magnetic or clearance gap widths are in no wise critical.

Another feature of economical importance in connection with the present invention resides in the fact that the field-producing permanent magnet structure and the brush holder are adaptable to use with the conventional wire wound armature and commutator assembly which is now commercially available and requires no modification whatsoever for its association in the motor assembly of the present invention.

The provision of a bipolar, direct current electric motor possessing the features of novelty and offering the advantages briefly outlined above being the principal object of the invention, numerous other objects and advantages will readily suggest themselves as the following description ensues.

In the accompanying two sheets of drawings forming a part of this specification, one illustrative embodiment of the invention has been shown.

Figures 1, 3, 4:
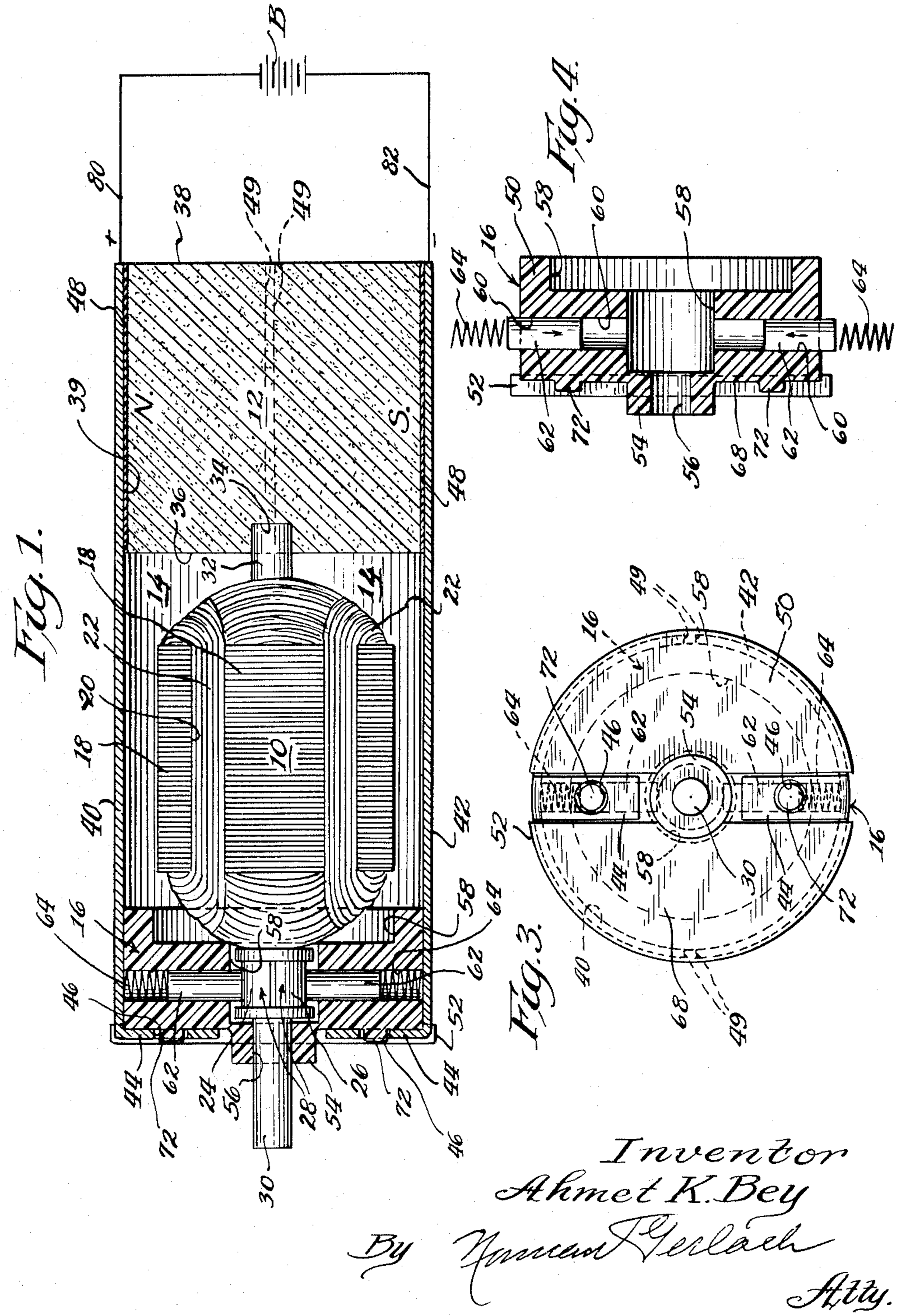
FIG. 1 is a sectional view taken substantially centrally and longitudinally through an electric motor embodying the present invention.
FIG. 3 is a front elevational view of the motor.
FIG. 4 is an enlarged sectional view taken through the brush holder of the motor.

Referring now to the drawings in detail, and in particular to FIGS. 1, 2, 3 and 4, the electric motor of the present invention involves in its general organization four principal parts, namely, an armature assembly 10 (hereinafter referred to simply as the armature), a unitary field-producing permanent magnet 12, a two-part composite pole piece assembly 14, and a brush assembly 16. The brush assembly 16, the armature 10, and the permanent magnet 12 are disposed in axial alignment while the pole piece assembly 14 encompasses these three constituents of the motor and is substantially axially coextensive therewith.

The armature 10 is purely conventional in its design and construction and embodies a shaft whereby it is supported rotatably. It is in the form of a generally cylindrical iron body or core 18 which is made up of thin sheets or laminations in order that the motion of the armature through the flux may not induce eddy currents in the iron itself. The core 18 is grooved as at 20 to receive the usual wire coils or windings 22. The conductors which establish the windings 22 are connected at their ends to the two segments 24 and 26 of a commutator assembly 28, which constitutes a part of the armature assembly 10, in the usual manner of armature construction. A section 30 of the armature shaft projects forwardly through the brush assembly 16 and is designed to receive thereon a gear, pinion, pulley or the like (not shown) whereby rotary motion of the armature is transmitted to the moving parts of the toy or other structure with which the motor is associated. A short section 32 of the shaft projects rearwardly of the armature and is piloted in a socket 34 in the forward end face 36 of the permanent magnet 12.

The permanent magnet 12 is of solid cylindrical design and the socket 34 which receives the shaft section 32 is formed centrally in the end face 36 of the magnet. The rear end face 38 of the magnet is disposed at the extreme rear end of the motor. The magnet 12 is provided with a cylindrical face 39. The axial extent of the magnet 12 is preferably slightly greater than its diameter and the magnet is magnetized in a transverse direction so as to present semi-cylindrical pole faces which have been labeled N and S in the drawings.

The pole piece assembly 14 is comprised of two identical pole pieces 40 and 42 and, therefore, a description of one of them will suffice for the other. The pole piece 40 is generally of semi-cylindrical design and consists of a trough-like sheet metal member which is open at its ends. The forward end of the member is provided with an integral inwardly extending tongue 44 which has a locating hole 46 formed centrally therein. The axial extent of the pole piece 40 is substantially equal to the over-all axial extent of the motor. The radius of curvature of the pole piece 40 is equal to the radius of the permanent magnet 12 and the rear region of the pole piece is cemented as at 48 to the adjacent upper portion of the cylindrical face 39 of the magnet 12. The extreme rear end edge of the pole piece lies flush with the rear end face 38 of the magnet.

The pole pieces 40 and 42 are disposed diametrically opposite to each other and present two pairs of opposed longitudinally extending side edges 49. The latter extend in slightly spaced parallelism. The two pole pieces substantially encompass the armature 10 and a major portion of the brush assembly 16, and are formed of magnetic material, such, for example, as mild steel.

The brush assembly 16 includes a generally cylindrical brush holder 50 (see FIG. 4) of cup-shape design and with a forward rim flange 52 and a forwardly projecting hub portion 54. Such hub portion is provided with a central opening 56 in which the end section 30 of the armature shaft is journalled. The brush holder 50 is formed with a centrally disposed socket 58 which faces inwardly and encompasses the commutator assembly 28. Radially disposed aligned bore-formed brush guides 60 are formed in the brush holder 50 and have slidably mounted therein a pair of commutator brushes 62. These brushes are urged inwardly against the commutator segments 24 and 26 by way of spiral compression springs 64 which are disposed in the outer ends of the guides 60. The brush holder 50 fits within the forward open end of the generally cylindrical cage-like structure which is formed by the two pole pieces 40 and 42 when the latter are cemented in place on the permanent magnet 12, as previously described, the forward rims 66 of the pole pieces abutting the rim flange 52 of the brush holder. When the brush holder 50 is in position between the two pole pieces 40 and 42, the outer ends of the guides 60 are closed by the forward regions of the pole pieces and the springs 64 are thus given a reaction backing.

The forward end face 68 of the brush holder 50 has formed therein a pair of radially extending aligned grooves 70. The bottom walls of these grooves are provided with integral locating protuberances 72 which register with and extend into the holes 46 in the tongues 44. Said tongues fit snugly within and substantially fill their respective grooves 70. The tongues 44 and the grooves 70 coact effectively to prevent rotation of the brush holder 50 with respect to the pole piece assembly 14. The brush holder 50 is formed of nonmagnetic material, preferably a plastic material, and it need not be cemented to the pole pieces 40 and 42. The tongues 44 serve to prevent forward shifting of the brush holder with the armature 10, while rearward or inward shifting of the brush holder is prevented by engagement of the hub portion 54 of the brush holder 50 with the forward or front end face of the commutator assembly 28.

While steel and certain other types of permanent magnet materials are capable of being shaped and magnetized as illustrated in the drawing and as described above, one such magnetic material which is capable of ease of such shaping and localized magnetization and is also extremely effective insofar as its magnetic strength is concerned is the material which is known as "Indox." The latter is a development of the Indiana Steel Products Company of Valparaiso, Indiana. It is a barium ferrite material and is characterized by the fact that it is electrically nonconductive. The material is extremely resistant to demagnetizing influences and evidences very low eddy current losses, these characteristics being an important factor in connection with use of the material as a field-producing material for an electric motor of the type under consideration. "Indox" is a magnetic material which exhibits extremely high coercive force, a low remanence and high permeability. Where a barium ferrite ceramic material is concerned, magnetic stability is pronounced and a permanent magnet of this character retains its magnetic strength despite weakening influences, such as contact with extraneous magnetic fields. Additionally, "Indox" and like ceramic materials are relatively light as compared to magnetic alloys. A feature which is highly important to its present use as a field-producing substance for the present electric motor is the fact that "Indox" may readily be spot-magnetized in any regions thereof selected for magnetization, thus making it possible economically to establish within the cylindrical magnet 12 of the motor, the diametrically-disposed pole faces N and S.

In assembling the constituent parts of the present bipolar electric motor, the operator will first pass the forward end of the armature forwardly through the brush holder so that the shaft section 30 projects forwardly of the hub portion 54 with the commutator assembly 28 entering the socket 58 and becoming radially aligned with the brush guides 60. A suitable jig may be employed for this assembly operation, and after the brushes 62 and the springs 64 have been inserted into the guides 60, the permanent magnet 12 may be brought against the armature at the rear end thereof so that the short rear shaft section 32 enters the pilot socket 34. Thereafter, the two pole pieces 40 and 42 are placed in position so that the tongues 44 extend into the grooves 70 and the bosses 72 project into the locating holes 46. The rear regions of the pole pieces 40 and 42 are then brought against the cylindrical face 39 of the magnet 12 and are cemented thereto. After a short period of drying or curing time for the cement, the assembly is complete and the cementitious bond between the two pole pieces 40 and 42 are the magnet 12 constitutes the sole bonding connection between the various parts of the motor, thus eliminating the use of mechanical fastening devices such as screws, rivets and the like.

Figure 2:
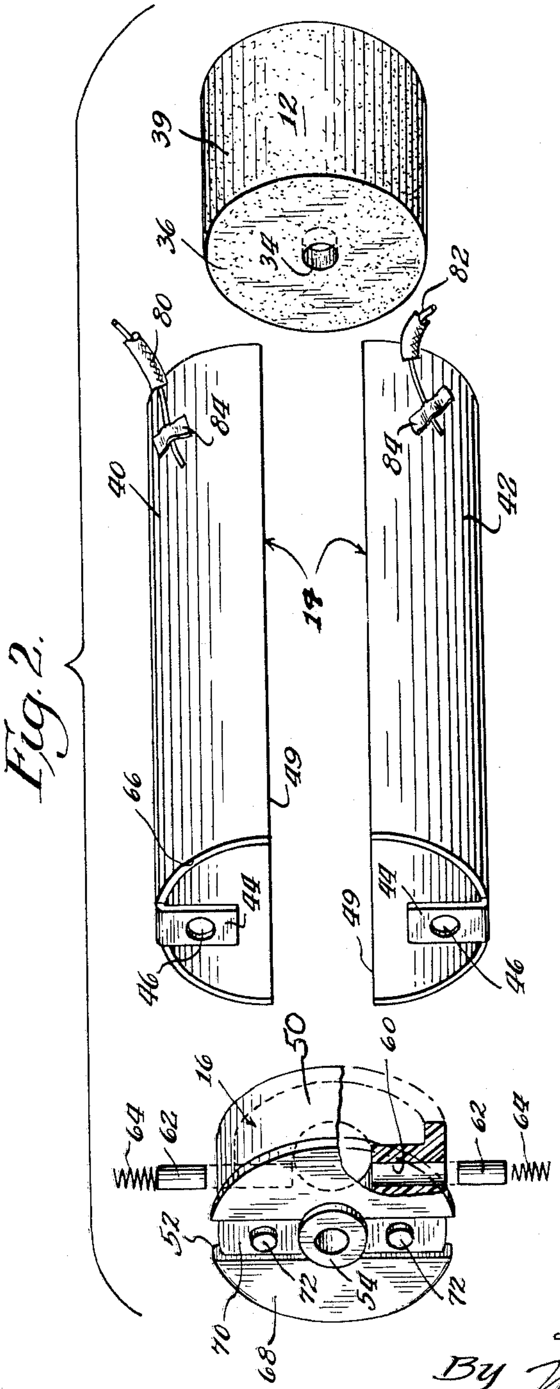
FIG. 2 is an exploded side perspective view of the motor with the armature omitted.

The present motor requires no special electrical terminals for operative electrical connection to a source of current supply. Since it is only necessary that current of opposite potential be applied to the two brushes, electrical connections may be made to any selected regions of the pole pieces 40 and 42, as, for example, to the rear end regions thereof as shown in FIG. 2. Soldered connections are not necessary, nor are the use of electrical terminals required. In the toy industry where a motor of this general type is permanently sealed within the toy structure or framework, it is sufficient that the ends of the lead-in conductors 80 and 82, which extend from a battery B, be taped as shown at 84 to the pole pieces 40 and 42, respectively, since the taped connection will not be disturbed during the life of the toy or other structure with which the motor is associated.

In the operation of the motor, the necessary magnetic field for traverse by the looped coils of the armature 10 is established by the portions of the pole pieces 40 and 42 which project forwardly of and overhang the forward rim of the magnet 12. The flux path is diametrically across the split cylindrical structure which is afforded by this pole piece assembly. The magnet 12, being removed from the peripheral regions of the armature, adds nothing to the over-all transverse dimension of the motor as a whole and the two pole pieces constitute, in effect, a cylindrical motor shell which need be of no greater diameter than the diameter of the armature and the thickness of the walls of the pole pieces, together with allowance for mechanical clearance between the pole pieces and armature to permit unobstructed rotation of the latter.

Figure 5:
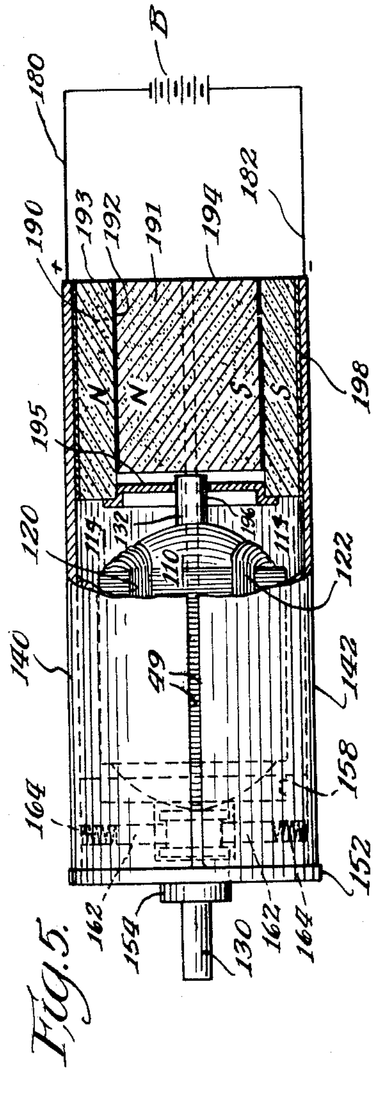
FIG. 5 is a fragmentary side elevational view, partly in section, of a modified form of electric motor embodying the invention.

In FIG. 5 a slightly modified form of electric motor embodying the principles of the present invention has been fragmentarily illustrated. In this form of the invention, the armature assembly, the pole piece assembly and the brush assembly remain substantially identical with the corresponding assemblies of the form of the invention shown in FIGS. 1 to 4, inclusive, and, therefore, to avoid needless repetition of description, similar reference numerals but of a higher order have been applied to the corresponding parts as between these former views and FIG. 5. In the modified form of the invention, the field-producing permanent magnet is of a composite nature and the armature mounting is slightly different, as will now be described in detail.

The permanent magnet assembly 112 of the motor of FIG. 5 is of two-piece construction and consists of an outer ring magnet 190 and an inner core magnet 191. The ring magnet 190 is in the form of a cylindrical tubular member which is formed of barium ferrite material and presents an internal centrally disposed cylindrical bore 192. The core magnet 191 is in the form of a solid cylindrical member of barium ferrite material, and the magnet 191 is telescopically received within the outer ring magnet 190 with a tight frictional fit. The rear end faces 193 and 194 of the magnets 190 and 191 are coplanar. The axial extent of the magnet 191 is slightly less than the axial extent of the magnet 190 to afford clearance at the front end of the magnet assembly 112 for a shallow cup-shaped nonmagnetic bearing support 195. The latter is nested within the forward rim of the magnet 190 and is formed with a pilot hole 196 for the rear or adjacent end of the armature shaft 132. The outer cylindrical surface 197 of the ring magnet 190 is cemented as at 198 to the adjacent inside faces of the pole pieces 124 and 126. Both the ring magnet 190 and the core magnet 191 are magnetized in a transverse direction as indicated by the labeling in FIG. 5. In assembling the two magnets, the core magnet 191 is inserted within the bore 192 so that like poles of the two magnets are in register with each other. Otherwise, the details of the motor assembly of FIG. 5 remain substantially the same as the details of the motor assembly of FIGS. 1 to 4, inclusive.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In a multipolar direct current motor of the character described, in combination, a cylindrical permanent magnet presenting a forwardly facing circular end face and having a cylindrical outer surface, said magnet being magnetized in a transverse direction to produce pole face areas on said outer surface, a plurality of pole pieces formed of magnetic material and secured to said magnet at their rear end regions, each pole piece overlapping a pole face area and projecting forwardly of said end face so as to produce a cage-like structure immediately forwardly of the magnet, a brush holder of nonmagnetic material supported from the forward ends of said pole pieces and spaced forwardly from said magnet, an armature rotatable within said cage-like structure and including an armature shaft having its rear end pivotally mounted adjacent to the inner end of the magnet and its forward end rotatably journalled in said brush holder, said brush holder being provided with radially extending brush guides, a commutator on said armature shaft in register with said brush guides, and brushes disposed within said brush guides and connected electrically to the pole pieces respectively.

2. In a multipolar direct current motor, the combination set forth in claim 1 and wherein the magnet has an axial and magnetic length greater than its diameter and the rear end regions of the pole pieces are in direct co-extensive face-to-face contact with their respective pole face areas on the magnet.

3. In a multipolar direct current motor, the combination set forth in claim 1 and wherein the pole pieces are uniformly arcuate in transverse cross section, and the forward rim of each pole piece is provided with an inwardly and radially extending tongue which radially overlaps the brush holder at the front side thereof so as to prevent forward axial shifting of the holder.

4. A motor as set forth in claim 1 and wherein the magnet is solid and has at its inner end a socket in which the rear end of the armature shaft is journalled.

5. In a bipolar direct current motor of the character described, in combination, a cylindrical permanent magnet presenting a forwardly facing circular end face and having a cylindrical outer surface, said magnet being magnetized in a transverse direction to produce diametrically disposed pole face areas of opposite polarity on said outer face, a pair of semi-cylindrical trough-like pole pieces formed of thin magnetic sheet metal and having their concave surfaces at the rear end regions thereof secured to the cylindrical outer surface of the magnet and overlying said pole face areas respectively, said pole pieces overhanging the forward rim of the magnet and having portions which project forwardly of the magnet and define, in combination with each other, a generally cylindrical cage-like structure immediately forwardly of the magnet, a tubular brush holder of nonmagnetic material, fitting within the forward end of said cage-like structure and spaced from said magnet, an armature rotatable within said cage-like structure and including an armature shaft having its rear end piloted directly in said magnet and its forward end projecting through and journalled in said brush holder, said brush holder being provided with a pair of radially extending brush guides, a commutator on said armature shaft and within the tubular brush holder in register with said guides, brushes within said brush guides and electrically connected to the pole pieces, and compression springs serving yieldingly to urge the brushes against said commutator.

6. A bipolar direct current motor as set forth in claim 5 and wherein the forward end regions of the pole pieces extend over and close the outer ends of the brush guides and the springs are interposed between the brushes and the portions of the pole pieces which extend over and close the outer ends of the brush guides and establish electrical contact between the brushes and the pole pieces.

7. A bipolar direct current motor as set forth in claim 5 and wherein the forward end regions of the pole pieces extend over and close the outer ends of the brush guides, the springs are interposed between the brushes and the portions of the pole pieces which extend over and close the outer ends of the brush guides and establish contact between the brushes and the pole pieces, and the forward rim of each pole piece is formed with an inwardly extending radially disposed tongue which overlies the forward end face of the brush holder and prevents forward axial shifting of the latter.

8. In a bipolar direct current motor of the character described, in combination, a cylindrical permanent magnet presenting a forwardly facing circular end face and having a cylindrical outer surface, said magnet being magnetized in a transverse direction to produce diametrically disposed pole face areas of opposite polarity on said cylindrical outer face, a pair of semi-cylindrical trough-like pole pieces formed of thin magnetic sheet metal and having their concave surfaces at the rear end regions thereof secured to the cylindrical outer surface of the magnet and overlying said pole face areas respectively, said pole pieces overhanging the forward rim of the magnet and having portions which project forwardly of the magnet and define, in combination with each other, a generally cylindrical cage-like structure immediately forwardly of the magnet, a tubular brush holder of nonmagnetic material, fitting within the forward end of said cage-like structure, an armature rotatable within the cage-like structure and including an armature shaft having its rear end piloted directly in said magnet and its forward end projecting through and journalled in said brush holder, said brush holder being provided with a pair of radially extending brush guides, a commutator on said armature shaft and within the tubular brush holder in register with said guides, brushes within said brush guides, compression springs interposed between the brushes and pole pieces and electrically connecting the former to the latter, the forward end face of said brush holder being provided with a pair of radial grooves therein, and a tongue on the forward rim of each pole piece, extending radially inwardly of the brush holder and fitting within one of said grooves for preventing axial shifting of the brush holder in a forward direction.

9. In a multipolar direct current motor of the character described, in combination, a field-producing magnet assembly including an outer ring magnet in the form of a tubular cylindrical magnet body having an axial cylindrical bore extending therethrough, and an inner core magnet in the form of a solid cylindrical body telescopically received within the bore of the outer ring magnet and substantially filling said bore, each of said magnet bodies being magnetized in a transverse direction to produce diametrically disposed pole face areas on its outer surface, like poles of the two magnet bodies being in close proximity to each other and in radial register, a pair of semi-cylindrical trough-like pole pieces formed of thin magnetic material and having their concave surfaces at the rear end regions thereof secured to the cylindrical outer surface of the outer ring magnet and overlying the pole face areas thereof respectively, said pole pieces overhanging the forward rim of the ring magnet and having portions which project forwardly of the ring magnet and define, in combination with each other, a generally cylindrical cage-like structure immediately forwardly of the magnet assembly, a tubular brush holder of nonmagnetic material fitting within the forward end of said cage-like structure and spaced from said magnet assembly, an armature rotatable within said cage-like structure and including an armature shaft having its forward end projecting through and rotatably journalled in said brush holder, a bearing support carried by said ring magnet and having a pilot hole therein in which the rear end of the armature shaft is rotatably journalled, said brush holder being formed with a pair of radially extending brush guides, a commutator on said armature shaft and within the tubular brush holder in register with said guides, brushes within said brush guides and electrically connected to the pole pieces, and compression springs interposed between the brushes and pole pieces and serving yieldingly to urge the brushes against said commutator.

No references cited.